Patented Aug. 22, 1933

1,923,641

UNITED STATES PATENT OFFICE 1,923,641

LOW VISCOSITY CELLULOSE FIBER AND PROCESS OF PRODUCING THE SAME

George A. Richter, Berlin, N. H., assignor to Brown Company, Berlin, N. H., a Corporation of Maine No Drawing. Application July 17, 1928
Serial No. 293,503

17 Claims. (Cl. 260—100)

In the manufacture of various cellulose derivatives or products such as artificial silk, lacquers, and films, it is the practice to convert cellulose fiber into a derivative such as the xanthate, nitrate, or acetate, and then to dissolve the derivative in a suitable solvent or mixture of solvents before forming into the ultimate product. In order to produce solutions of viscosity sufficiently low to permit successful spinning into silk filaments, or use as lacquers, or forming into films, it is necessary to depolymerize to lower the solution viscosity of the fiber used as a raw material, or to treat the derivative prepared therefrom in a manner to lower its solution viscosity. In the viscose-rayon industry, for example, depolymerization to lower the solution viscosity of the fiber is generally effected by soaking or submersing sheets of fiber (so-called drier sheets) in a caustic soda solution of mercerizing strength, pressing the sheets free of excess solution and disintegrating them into a fluffy mass of crumbs, and finally ageing the mass for a considerable period of time. Not only is such a process time-consuming and expensive, but mercerization destroys the paper making characteristics of the fiber, and the ageing conditions must be carefully controlled to prevent degradation of the fiber into oxycelluloses and other undesirable reaction products. When the cellulose derivative is treated to lower its solution viscosity, as nitrocellulose sometimes is, under heat and pressure, not only must it be handled in comparatively small batches, but the treatment must also be carefully controlled to prevent decomposition from taking place.

The term "solution viscosity" as applied to cellulose fiber is an arbitrary one, being indicative of the viscosity of a cellulose derivative solution producible therefrom. The solution usually employed as a standard is a cuprammonium cellulose solution of prescribed or definite cellulose concentration, the viscosity being determined by measuring the time of efflux of a definite volume of such solution under standard conditions through an orifice of standard size. The solution viscosity of fiber is herein given in absolute C. G. S. units, and is determined by measuring the viscosity of a solution of 6 grams of dry fiber in a cuprammonium solution composed of 225 cc. of 28% ammonia water containing 9 grams of cuprous oxide. The C. G. S. unit is employed because it is definite, denoting a viscosity one hundred times that of water at 20° C., wherefore a cuprammonium cellulose solution prepared from a certain type of fiber by means of which such fiber is identified as having a solution viscosity of 10 is one thousand times as viscous as water at 20° C. Glycerine, which is often referred to as a standard when dealing with solution viscosity, for example, has a viscosity value of between eight and ten units.

One of the objects of the present invention is to provide a process for markedly lowering the solution viscosity of cellulose fiber while it is in the form of a 2% to 10% aqueous pulp suspension, as this permits ready and continuous handling of large amounts of fiber by the use of comparatively inexpensive apparatus. Another object of the present invention is to effect a lowering of the solution viscosity of the fiber without impairing the capacity of such fiber undergoing hydration or gelatinization when beaten (when such impairment is undesirable), so that the resulting fiber may be successfully sheeted into tissues or waterleaf papers suitable for nitration, acetylation, or other chemical conversion. Still another object of the present invention is to effect a lowering of the solution viscosity of the fiber without injuriously affecting the alpha cellulose content of the fiber and with a high yield of final product. I have discovered that when cellulose fiber is treated with solutions of salts of certain of the acids of manganese, such as the manganates and the permanganates, a marked lowering of the solution viscosity of the fiber is effected without materially affecting the alpha cellulose content of the fiber. According to the process of the invention, this treatment is carried out under conditions resulting in a fiber having a solution viscosity below 1, which value is especially desired when the fiber is used as a raw material in the manufacture of cellulose products of the character described, whereupon colored reaction products are removed from the fiber.

In carrying out the process of the present invention, cellulose fibers of various origins may be employed as a raw material. For example, one may start with white wood fiber refined to an alpha cellulose content of about 94% and having a solution viscosity of about 5 to 9, with cotton fiber as long staple, cotton linters, or rag pulp, and having a solution viscosity of about 5 to 50, or with chemical wood pulp such as bleached sulphite pulp, having an alpha cellulose content of about 86% to 87% and a solution viscosity of about 5 to 7. So, too, one may use raw or incompletely refined wood pulps such as unbleached, refined sulphite pulp, unbleached, unrefined sulphite pulp, or even kraft pulp as the raw material.

When a white refined wood pulp having an alpha cellulose content of 94% to 96% and a solution viscosity of 5 to 8 is employed as a raw material, it may be treated, say, as an 8% to 10% pulp suspension, with a neutral or slightly acid solution containing 1% to 2% potassium permanganate, based on fiber at temperatures, say, from 15° to 40° C. After about two hours, it will be found that the solution viscosity of the fiber has been reduced to below 1, without reducing its alpha cellulose more than about 0.2% to 0.4%. The fiber will assume a dark brown or chocolate color as the treatment progresses, owing to the reduction of the permanganate to the lower oxides of manganese, some of which will become deposited on the fiber. The fiber may be washed and then decolorized by treatment with an agent which converts the manganese oxides to manganous salts. For instance, the fiber may be decolorized with sodium bisulphite, and then washed to produce a snow-white product having an alpha cellulose content of about 94%, and a solution viscosity less than 1.

When an acidic permanganate solution is employed in the treatment, free alkali will not be produced as a reaction product, as the acid neutralizes the alkali as soon as it is liberated. When, on the other hand, a neutral permanganate solution such as neutral potassium permanganate is employed, the alkalinity of the solution will gradually increase, as the reduction of the permanganate to manganese oxides by the fiber results in the liberation of free potassium hydroxide. When it is undesirable to have alkali present in the solution, a suitable amount of magnesium sulphate or like metal salt, whose positive radical is precipitated out as hydroxide by potassium hydroxide may be added to the neutral permanganate solution, so that as the potassium hydroxide is progressively liberated, it will react progressively with the magnesium sulphate to form potassium sulphate and magnesium hydroxide, which reaction products have little effect on the fiber.

If desired, hydrogen peroxide may be used in lieu of reducing agents such as sodium bisulphite, in decolorizing the fiber after the permanganate treatment. The hydrogen peroxide not only has the effect of reacting with the manganese oxides deposited on the fiber, but also has a marked effect on lowering the solution viscosity of the fiber, so that when employed after the permanganate treatment, less permanganate may be employed than would otherwise be necessary.

It may be desirable to increase the alpha cellulose content of the product. This may be accomplished by treating the product with a comparatively dilute alkaline solution to dissolve oxycelluloses or other alkali-soluble products in the fiber. For instance, the product may be treated at boiling temperatures with a solution containing, say, from 1% to 3% caustic soda, based on fiber. Such treatment does not raise the solution viscosity of the fiber, but does increase the alpha cellulose content of the fiber to or above that of the original fiber employed as a raw material Such solutions as those of sodium sulphide, sodium carbonate, trisodium phosphate, are also suitable for increasing the alpha cellulose content of the product. When a solution of sodium sulphide is employed for this purpose, it may be used so as to serve as the decolorizing agent. That is to say, after the permanganate treatment and washing of the fiber has been effected, it may be treated with sodium sulphide solution of sufficient strength both to decolorize it and to increase its alpha cellulose content. One may also use a solution of both sodium sulphide and other alkali such as caustic soda for this purpose, the solution containing sufficient sodium sulphide to decolorize the fiber and sufficient caustic soda to increase the alpha cellulose content to the desired value.

I have found that alkaline permanganate solutions are more effective in lowering the solution viscosity of cellulose fiber than neutral or acid solutions, but that such treatment may involve a reduction in alpha cellulose content of about 1% to 3%, depending upon the conditions under which the treatment is effected. Such a treatment, however, has utility when it is desired to produce a product of especially low solution viscosity, particularly as the alpha cellulose content of the product may be increased to or above that of the fiber employed as a raw material by digesting the product in an alkaline solution, as previously described. For example, a fiber of very low solution viscosity may be produced by treating a white, refined wood fiber similar to that previously described with a solution of permanganate containing 0.5% to 2% potassium permanganate and 1% to 2% caustic soda, based on fiber, at temperatures of, say 15° to 40° C. The resulting fiber may be increased in alpha cellulose content by the unconsumed caustic soda in the solution, if the solution is heated to a temperature high enough (say, boiling) to dissolve oxycelluloses and is kept in contact with the fiber and the mixture and other alkali-soluble components present in the fiber. When such a process is carried out, even comparatively large amounts of alkali may be advantageously employed in some cases in the permanganate solution,—a solution containing 1% to 2% potassium permanganate and about 6% to 10% caustic soda, based on fiber, being sometimes desirable, as there is sufficient caustic soda present in the mass of pulp after the permanganate has been consumed, to dissolve especially at elevated temperature fairly large quantities of oxycelluloses or other alkali-soluble components which may have been formed. While the pulp is undergoing alkaline digestion at elevated temperature, sodium sulphide may be added to the alkaline solution to dissolve resulting manganese oxides from the fiber, but the sodium sulphide should not be added until the permanganate has been substantially entirely consumed, since otherwise reaction would ensue between sodium sulphide, which is a reducing agent, and the permanganate, which is an oxidizing agent.

Rather than carrying out a treatment of the fiber with a permanganate solution maintained distinctly alkaline throughout the treatment, the solution may be rendered alkaline toward the end of the treatment. That is to say, the fiber may be treated with neutral permanganate, and the permanganate allowed to react on the fiber at, say, about room temperature until substantially equilibrium conditions have been attained, whereupon caustic soda or other alkali may be added directly thereto and the reaction allowed to continue until a substantially complete consumption of the permanganate has taken place. The fiber may then be washed free of reaction products, decolorized, and then, if desired, digested in alkaline liquor to raise alpha cellulose content.

When mercerization of the fiber is not objectionable, the fiber may be advantageously treated with permanganate solutions of mercerizing alkalinity. Such a treatment requires careful control, because of the intensity of the reaction on the fiber and the tendency to degrade the fiber seriously. Thus, in order to avoid local overtreatment of the fiber, it is necessary to add the permanganate to the fiber as a relatively dilute solution, and to produce relatively thin pulp suspensions, say, 2% to 4%. When the treatment is effected with a mercerizing permanganate solution, a very rapid and marked reduction in solution viscosity of the fiber takes place while such fiber increases its alpha cellulose content, so that the resulting product is of very low viscosity and of very high alpha cellulose content. An example of this type of procedure may be substantially as follows. A white, refined wood pulp may be added with rapid agitation to, say, an 18% caustic soda solution containing, say, 1% to 2% permanganate, based on fiber, to produce, say, a 3% fiber suspension. After the initial thorough mixing, the stock may be allowed to remain in contact with the alkaline permanganate for from, say, about thirty minutes to three hours. During this time, it will be noted that as the permanganate is gradually consumed, the initial intense purple of the solution progressively changes to a chocolate brown. The pulp may then be washed and the fiber decolorized with sodium bisulphite, sulphurous acid, or other suitable reducing agent. The resulting mercerized fiber will be of brilliant white color and have an alpha cellulose content of about 94% to 98%, and a solution viscosity of 0.3 to 0.6. Such fiber is especially suitable for conversion into viscose, as no ageing is required to depolymerize a soda cellulose prepared therefrom.

As previously stated, various types of fiber may be employed as the raw material. When unbleached sulphite pulp is employed as the raw material, it may be treated with chlorine water to remove ligneous components therefrom, and then treated with a mercerizing permanganate solution to produce a final product of high alpha cellulose content and low solution viscosity. In such case, a permanganate solution of sufficient strength should be used, so that the fiber will be white after removal of the manganese oxides resulting from the treatment. One of the advantages residing in all of the treatments hereinbefore outlined is that ligneous and resinous components in the pulp are removed by the permanganate solution treatment, thus making possible the production of better grade derivatives, as such components, even when present in comparatively small amount, tend to discolor derivatives and render them unstable.

While I have cited the use of the permanganates in the specific examples given, I regard the manganates as their chemical equivalents, as they may be successfully employed in carrying out the process of the present invention. As there is no generic expression for both these salts, by the expression "permanganate" as used in the appended claims, I mean also to include the manganates.

There may be other changes or modifications in the process, which will suggest themselves to those skilled in the art, without departing from the spirit or scope of invention as defined by the appended claims.

What I claim is:

1. A process which comprises treating cellulose fiber of the nature of cotton and pre-liberated wood pulp with permanganate solution, removing colored reaction products, and digesting the fiber in alkaline solution.

2. A process which comprises treating cellulose fiber of the nature of cotton and pre-liberated wood pulp with permanganate solution, removing colored reaction products, and digesting the fiber in a comparatively dilute, heated alkaline solution.

3. A process which comprises treating cellulose fiber of the nature of cotton and pre-liberated wood pulp, in a distinctly alkaline permanganate solution, removing colored reaction products, and digesting the fiber in an alkaline solution.

4. A process which comprises treating cellulose fiber of the nature of cotton and pre-liberated wood pulp with a distinctly alkaline permanganate solution, removing colored reaction products, and digesting in a comparatively dilute, heated alkaline solution.

5. A process which comprises treating cellulose fiber of the nature of cotton and pre-liberated wood pulp with a permanganate solution, adding alkali to the solution after the permanganate has been substantially consumed, and removing colored reaction products.

6. A process which comprises treating cellulose fiber of the nature of cotton and pre-liberated wood pulp with a permangate solution, and after the permanganate has been substantially consumed treating the pulp with a solution of sodium sulphide.

7. A process which comprises treating cellulose fiber of the nature of cotton and pre-liberated wood pulp with a permanganate solution, and after the permanganate has been substantially consumed treating the pulp with a solution of sodium sulphide and caustic soda.

8. A process which comprises treating cellulose fiber of the nature of cotton and pre-liberated wood pulp with a permanganate solution, adding sodium sulphide to the solution after the permanganate has been substantially consumed, and then treating with sulphurous acid solution.

9. A process which comprises treating cellulose fiber of the nature of cotton and pre-liberated wood pulp with a non-alkaline permanganate solution, removing colored reaction products, and digesting the fiber in an alkaline solution.

10. A process which comprises treating celluose fiber of the nature of cotton and pre-liberated wood pulp with a permanganate solution, heating the solution after the permanganate has been substantially consumed, and adding sodium sulphide to the heated solution to dissolve manganese oxides from the fiber.

11. A process which comprises treating cellulose fiber of the nature of cotton and pre-liberated wood pulp with a permanganate solution, washing the fiber after the permanganate has been substantially consumed, and treating the washed fiber with a solution of sodium sulphide.

12. A process which comprises treating cellulose fiber of the nature of cotton and pre-liberated wood pulp with a substantially neutral permanganate solution containing magnesium sulphate to form progressively alkali sulphate and magnesium hydroxide while the permangante progressively undergoes reduction to manganese oxides by the fiber.

13. A process which comprises treating cellulose fiber of the nature of cotton and pre-liberated wood pulp with permanganate solution, and subjecting the fiber to the action of an alkaline solution after the permanganate has been substantially consumed.

14. A process which comprises treating cellulose fiber of the nature of cotton and pre-liberated wood pulp with a permanganate solution containing alkali, and permitting the fiber to remain in contact with the solution for a considerable period of time after the permanganate has been substantially consumed.

15. A process which comprises treating cellulose fiber of the nature of cotton and pre-liberated wood pulp with an alkaline permangante solution, and subjecting the fiber to the action of an alkaline solution after the permanganate has been substantially consumed.

16. A process which comprises treating cellulose of the nature of cotton and chemical wood pulp with a permanganate solution, and then digesting the cellulose in an alkaline solution whose alkalinity is furnished at least in part by sodium sulphide.

17. A process which comprises treating cellulose of the nature of cotton and chemical wood pulp with a permangate solution, washing the cellulose so treated, and digesting the washed cellulose in an alkaline solution whose alkalinity is furnished at least in part by sodium sulphide.

GEORGE A. RICHTER.